US011558244B2

(12) United States Patent
Dabagh et al.

(10) Patent No.: US 11,558,244 B2
(45) Date of Patent: Jan. 17, 2023

(54) IMPROVING PERFORMANCE OF MULTI-PROCESSOR COMPUTER SYSTEMS

(71) Applicant: MICROSOFT TECHNOLOGY LICENSING, LLC, Redmond, WA (US)

(72) Inventors: Alireza Dabagh, Kirkland, WA (US); Murari Sridharan, Sammamish, WA (US); Joseph Nievelt, Bellevue, WA (US); Ganesh Srinivasan, Woodinville, WA (US); Muhammad Junaid Shahid, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 717 days.

(21) Appl. No.: 16/661,890

(22) Filed: Oct. 23, 2019

(65) Prior Publication Data
US 2020/0059402 A1 Feb. 20, 2020

Related U.S. Application Data

(63) Continuation of application No. 15/434,097, filed on Feb. 16, 2017, now Pat. No. 10,484,236, which is a continuation of application No. 14/696,474, filed on Apr. 26, 2015, now abandoned, which is a continuation of application No. 13/219,373, filed on Aug. 26, 2011, now Pat. No. 9,021,138.

(51) Int. Cl.
*G06F 9/46* (2006.01)
*H04L 41/0803* (2022.01)
*G06F 9/50* (2006.01)
*G06F 15/173* (2006.01)
*H04L 49/90* (2022.01)
*G06F 9/48* (2006.01)

(52) U.S. Cl.
CPC ........ *H04L 41/0803* (2013.01); *G06F 9/5088* (2013.01); *G06F 15/1735* (2013.01); *H04L 49/9068* (2013.01); *H04L 49/9078* (2013.01); *G06F 9/4843* (2013.01)

(58) Field of Classification Search
CPC ............................. G06F 9/5088; G06F 9/4843
See application file for complete search history.

*Primary Examiner* — Gregory A Kessler
(74) *Attorney, Agent, or Firm* — Ray Quinney & Nebeker P.C; James Bullough

(57) ABSTRACT

Embodiments of the invention may improve the performance of multi-processor systems in processing information received via a network. For example, some embodiments may enable configuration of a system such that information received via a network may be distributed among multiple processors for efficient processing. A user (e.g., system administrator) may select from among multiple configuration options, each configuration option being associated with a particular mode of processing information received via a network. By selecting a configuration option, the user may specify how information received via the network is processed to capitalize on the system's characteristics, such as by aligning processors on the system with certain NICs. As such, the processor(s) aligned with a NIC may perform networking-related tasks associated with information received by that NIC. If initial alignment causes one or more processors to become over-burdened, processing tasks may be dynamically re-distributed to other processors so as to achieve a more even distribution of the overall processing burden across the system.

20 Claims, 12 Drawing Sheets

IMPROVING PERFORMANCE OF MULTI-PROCESSOR COMPUTER SYSTEMS

CROSS-REFERENCE TO RELATED APPLICATIONS

This application is a continuation of U.S. patent application Ser. No. 15/434,097, titled "IMPROVING PERFORMANCE OF MULTIPROCESSOR COMPUTER SYSTEMS", filed Feb. 16, 2017, allowed, which is a continuation of U.S. patent application Ser. No. 14/696,474, titled "IMPROVING PERFORMANCE OF MULTIPROCESSOR COMPUTER SYSTEMS", filed Apr. 26, 2015, now abandoned, which was a continuation of U.S. patent application Ser. No. 13/219,373, titled "IMPROVING PERFORMANCE OF MULTIPROCESSOR COMPUTER SYSTEMS", filed Aug. 26, 2011, issued as U.S. Pat. No. 9,021,138 on Apr. 28, 2015, which are hereby incorporated by reference.

BACKGROUND

Some computer systems employ multiple processors. These processors may, for example, be used to process information received from a remote computer via a network. Typically, the information is received at the computer by one or more network interface controllers (NICs) that receive information transmitted in accordance with a prescribed network communication protocol (e.g., TCP, or Transmission Control Protocol). The received information may, for example, include requests to perform networking-related operations that may be distributed across the multiple processors for execution. Allowing multiple processors to simultaneously perform networking-related operations can improve the computer's performance. One known architecture which employs multiple processors to perform networking-related operations is a "symmetric multiprocessor" (SMP) system architecture.

In a conventional technique for processing information received via a network on an SMP system, a NIC on the computer receives a data packet and stores it in memory with a packet descriptor that includes pointer information identifying the location of the data in memory. If a previous packet is not currently being processed, an interrupt is generated to one of the processors, and an interrupt service routine (ISR) executes, suspending further interrupts from the NIC while a deferred procedure call (DPC) is requested to run on a processor selected to handle the packet. As the DPC executes, one or more data packets and descriptors are retrieved from memory to build an array, and the processor then initiates processing the packet. After the DPC completes, further interrupts from the NIC are re-enabled, so that additional packets may be distributed to one or more other of the processors.

In some conventional multi-processor architectures, one or more processors may have associated memory. For example, in a Non-Uniform Memory Access (NUMA) system, one or more processors may comprise a NUMA node having an associated set of memory addresses that are accessed most efficiently by processors in the NUMA node. In this respect, a particular NUMA node on a system may be thought of as being "closest" to the set of memory addresses associated with the node, and "further away" from other sets of memory addresses that are each associated with other NUMA nodes on the system. In a NUMA-enabled system, access by a first NUMA node to a memory address associated with a second NUMA node is slower than access by the second NUMA node would be.

SUMMARY

Some embodiments of the present invention provide methods and apparatus for improving the performance and/or scalability of multi-processor computer systems, such as those which employ NUMA and/or other system architectures. For example, some embodiments of the invention provide tools and/or techniques for configuring a system so that processing tasks associated with information (e.g., packets and/or other traffic) received via a network may be distributed among multiple processors on the system, so that the tasks may be performed efficiently. For example, in some embodiments of the invention, multiple configuration options (e.g., implemented as a set of "profiles") may be presented to a user (e.g., system administrator) for selection, with each configuration option being associated with a particular mode of processing information received via a network. In this respect, the inventors have recognized that there may not be one single configuration scheme that is suitable and optimal for every type of system. As such, some embodiments of the invention provide multiple configuration options, so that users may select one or more configuration options that capitalize on a particular system's characteristics and/or capabilities.

In one example configuration option described herein, specific processors may be aligned with certain NICs on the system, so that the processor(s) aligned with a particular NIC perform(s) networking-related operations associated with information received via a network by the NIC. A processor may be aligned with a NIC in any of numerous ways. For example, in one technique described below, a processor may be aligned with a NIC by assigning execution of ISRs and DPCs generated by the NIC to the processor. Of course, any suitable criteria may define alignment of a processor to a NIC, as embodiments of the invention are not limited to any particular manner of implementation.

An example configuration option may enable a user to specify that if an initial alignment of processors to NICs causes one or more processors to be over-burdened with a disproportionate amount of networking-related tasks while other processors are under-utilized, tasks may be dynamically re-distributed to other processors on the system to achieve a more even distribution of the overall processing burden. As a result, a system may perform networking-related tasks more efficiently.

In some embodiments of the invention, configuration of a multi-processor system may account for the characteristics of an architecture employed by the system. For example, embodiments of the invention used with a NUMA system may cause processing tasks to be distributed across NUMA nodes on the system. If a subsequent redistribution of processing tasks is desired, redistribution may be performed in a manner which does not result in a processor assigned to one NUMA node attempting to access a memory address associated with another NUMA node, which can detract significantly from system performance.

Some embodiments of the invention may provide other features designed to benefit NUMA systems. For example, some embodiments of the invention may enable applications executing on NUMA systems to determine the NUMA node on which networking-related processing for the application is performed, so that the application may execute on the same NUMA node. As a result, attempts to access memory addresses associated with another NUMA node may be prevented.

The foregoing is a non-limiting summary of the invention, which is defined by the attached claims.

BRIEF DESCRIPTION OF DRAWINGS

The accompanying drawings are not intended to be drawn to scale. In the drawings, each identical or nearly identical component that is illustrated in the various figures is represented by a like numeral. For purposes of clarity, not every component may be labeled in every drawing. In the drawings.

DETAILED DESCRIPTION

Some embodiments of the present invention may improve the performance of multi-processor computer systems in processing information received via a network. For example, some embodiments of the invention may enable configuration of a system such that information received via a network may be distributed among multiple processors for efficient processing. A user (e.g., system administrator) may select from among multiple configuration options, each of which may generally be considered a "policy," or profile, defining a mode of processing information received via a network. By selecting one or more configuration options, the user may specify how information received via the network is processed to capitalize on the system's characteristics. For example, in some embodiments, a multi-processor system may be configured such that specific processors on the system are aligned with certain NICs, so that each processor aligned with a NIC performs networking-related operations associated with information received by the NIC. For example, in some embodiments, a processor aligned with a NIC may process ISRs and DPCs (or any other suitable operation type(s)) generated by the NIC, and not operations generated by any other NIC on the system.

In some embodiments of the invention, if an initial alignment of processors to NICs causes one or more processors to become over-burdened while other processors are under-utilized, processing tasks may be dynamically redistributed so as to achieve a more even distribution of the overall processing burden across processors on the system. As a result, the system may efficiently utilize the processing resources at its disposal to perform networking-related operations.

Some embodiments of the invention provide specific benefits for systems which employ NUMA architectures. For example, some embodiments may enable networking-related tasks to be distributed across processors so that multiple NUMA nodes are utilized. If a redistribution of processing tasks is subsequently performed, redistribution may be performed in a manner which does not result in a processor assigned to one NUMA node attempting to access a memory address associated with another NUMA node, as described below.

Figure 1:
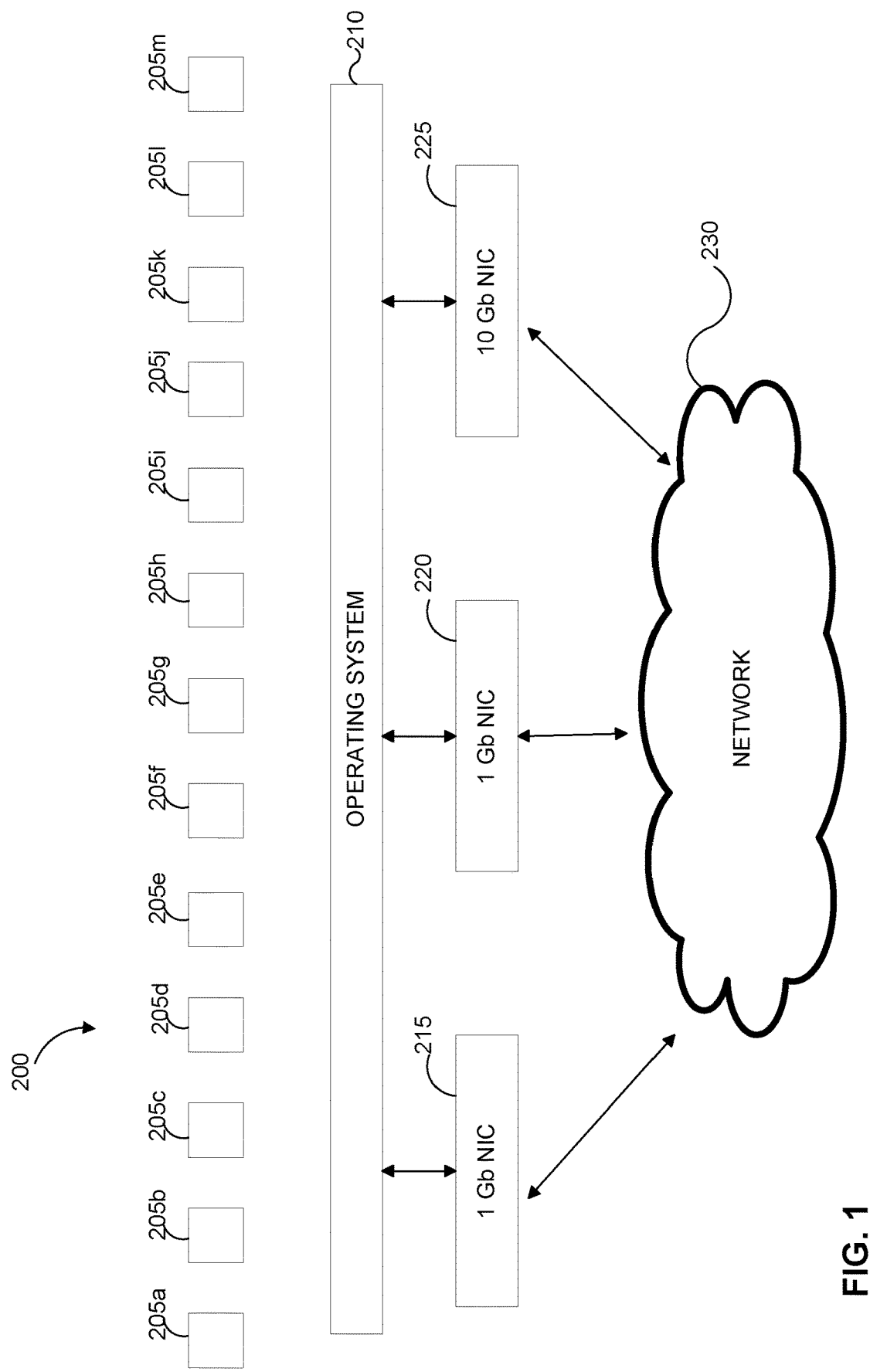
FIG. 1 is a block diagram depicting some example components of a system in which embodiments of the invention may be implemented.

An example multi-processor system 200 on which embodiments of the invention may be implemented is depicted conceptually in FIG. 1. System 200 includes processors 205*a*-205*m*, operating system 210, and NICs 215, 220 and 225. In system 200, each of NICs 215, 220 and 225 receives information from network 230, and communicates with operating system 210 to distribute processing of the information to certain of processors 205*a*-205*m*.

Figure 2:
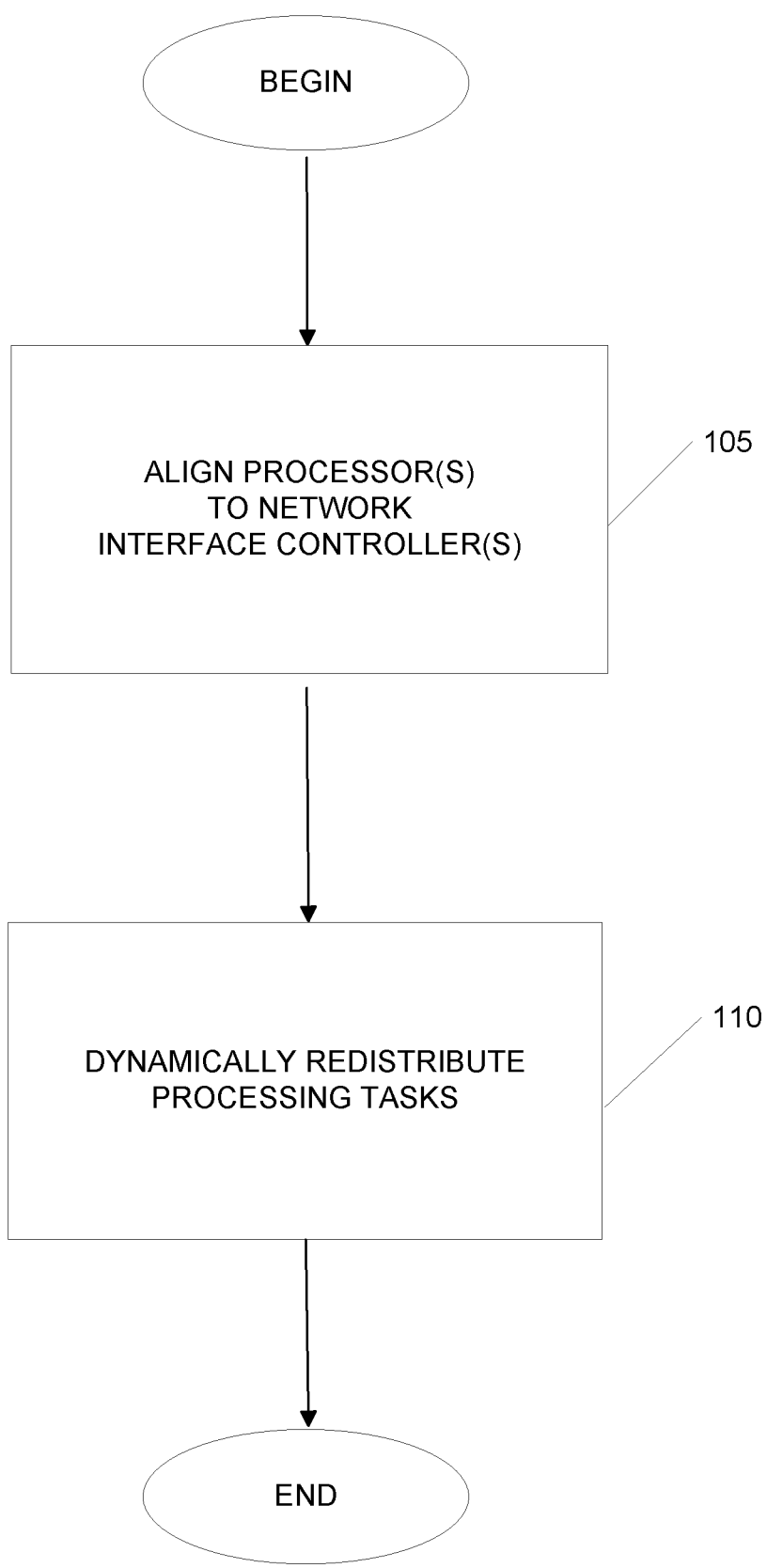
FIG. 2 is a flowchart depicting an example process for aligning one or more processors with one or more network interface controllers (NICs), in accordance with some embodiments of the invention.

An example process 100 which may be performed to configure system 200 to perform networking-related tasks is shown in FIG. 2. At a high level, process 100 involves aligning one or more of processors 205*a*-205*m* in system 200 with one or more of NICs 215, 220, 225, so that processing on information received by a particular NIC is performed by the associated processor(s), and then redistributing (e.g., dynamically, based on conditions at run-time) processing tasks if one or more processors becomes overly burdened while others go under-utilized. Process 100 may be performed, as an example, when a user of system 200 (e.g., an administrator) provides input to select one or more configuration options for system 200, such as from among a set presented by operating system 210. Configuration options may, for example, be presented to the user via a user interface, although embodiments of the invention are not limited to such an implementation. For example, a user may execute one or more programmed routines to perform process 100, or any other suitable technique may be employed.

Figure 3:
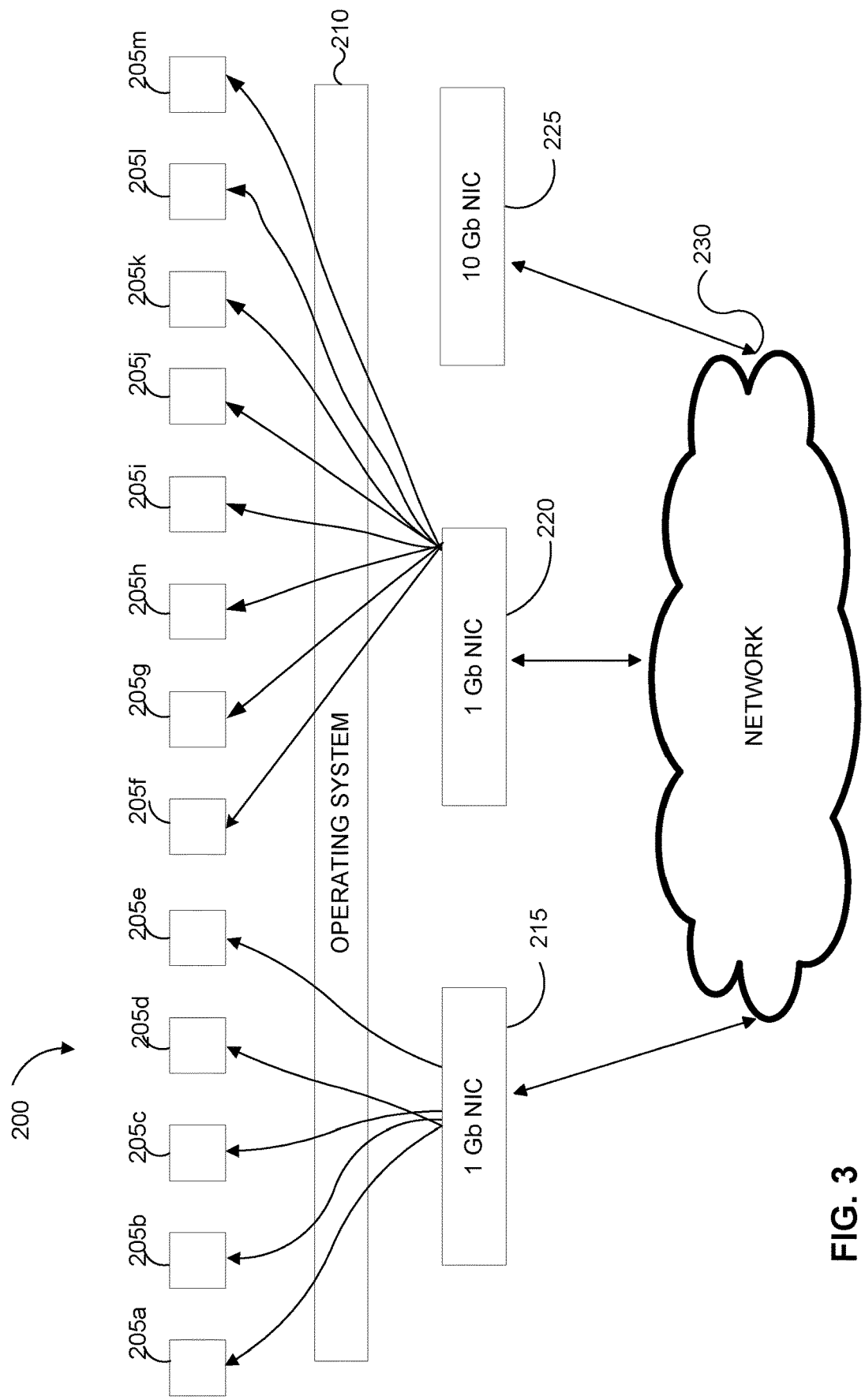
FIG. 3 is a block diagram depicting an example technique for aligning processors with NICs, in accordance with some embodiments of the invention.

At the start of process 100, one or more processors are aligned with one or more NICs in the system in act 105. FIG. 3 provides a conceptual representation of an alignment of certain of processors 205*a*-205*m* with certain of NICs 215, 220 and 225. Alignment may, for example, be performed during a boot process performed by operating system 210, as NICs 215, 220, 225 become visible and available to it.

Operating system 210 may, for example, determine whether each of NICs 215, 220, 225 is in a connected state, and if so, align certain of processors 205a-205n to certain of NICs 215, 220, 225. In the example shown in FIG. 3, the result of act 105 is that six of the thirteen total processors (i.e., processors 205a-205f) are aligned with NIC 215, and the remaining seven processors (i.e., processors 205g-205m) are aligned with NIC 220. Of course, the manner of alignment depicted in FIG. 3 is merely illustrative and non-limiting. For example, any suitable number and arrangement of processors may be aligned with a particular NIC, as embodiments of the invention are not limited in this respect. In some embodiments, as a consequence of aligning a processor with a particular NIC, the processor executes ISRs and DPCs generated by the NIC, and not ISRs or DPCs generated by any other NIC on the system. As such, when a NIC with which a plurality of processors is aligned receives a packet and generates an ISR or DPC, it selects one of the processors aligned with the NIC to process the ISR or DPC for the packet.

Figure 4:
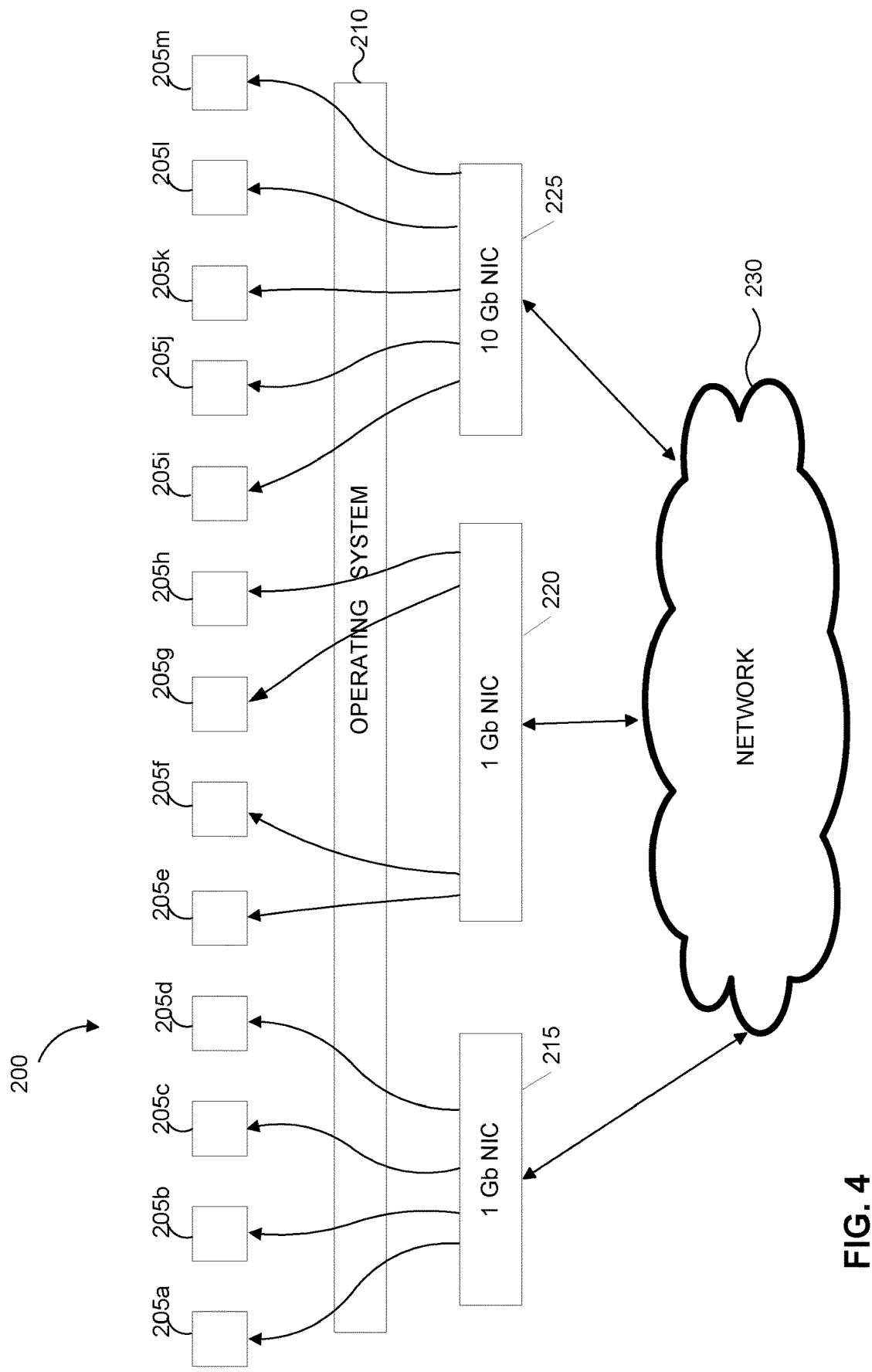
FIG. 4 is a block diagram depicting an example technique for aligning processors with NICs, in accordance with some embodiments of the invention.

In some embodiments of the invention, different configuration options may specify different criteria for aligning processors with NICs. For example, in some embodiments, a NIC having greater bandwidth may be aligned with a proportionally greater number of processors than other NICs having lesser bandwidth, to enable a system to capitalize on a high-speed connection. In this respect, FIG. 4 depicts, in addition to NICs 215 and 220 which each have one gigabyte of bandwidth, NIC 225, which has ten gigabytes of bandwidth. In the illustrative example shown in FIG. 4, when NICs 215, 220 and 225 become available to operating system 210 during boot and are determined to be in a connected state, four of the thirteen total processors are aligned with each of NICs 215 and 220 (i.e., processors 205a-205d are aligned with NIC 215, and processors 205e-205h are aligned with NIC 220), while five processors are aligned with NIC 225 (i.e., processors 205i-205m). Of course, the distribution illustrated in FIG. 4 is merely one example distribution, as processors may be aligned with particular NICs in any suitable proportion and arrangement. Embodiments of the invention are not limited to any particular implementation. For example, in an alternative distribution, eight (or another number of) processors might be aligned with NIC 225, and the remaining five (or another number) may be distributed among NICs 215 and 220. Any suitable distribution may be employed.

Some embodiments may limit a number of processors aligned with a particular NIC to accommodate the NIC's ability to handle a predetermined quantity of processors. For example, if NIC 225 were only capable of supporting four processors, then only four (or fewer) processors might be aligned with NIC 225, and the remaining nine processors may be distributed among NICs 215 and 220. Any suitable manner of aligning processors with NICs, recognizing any suitable constraint(s), may be employed, as embodiments of the invention are not limited in this respect.

Figure 5:
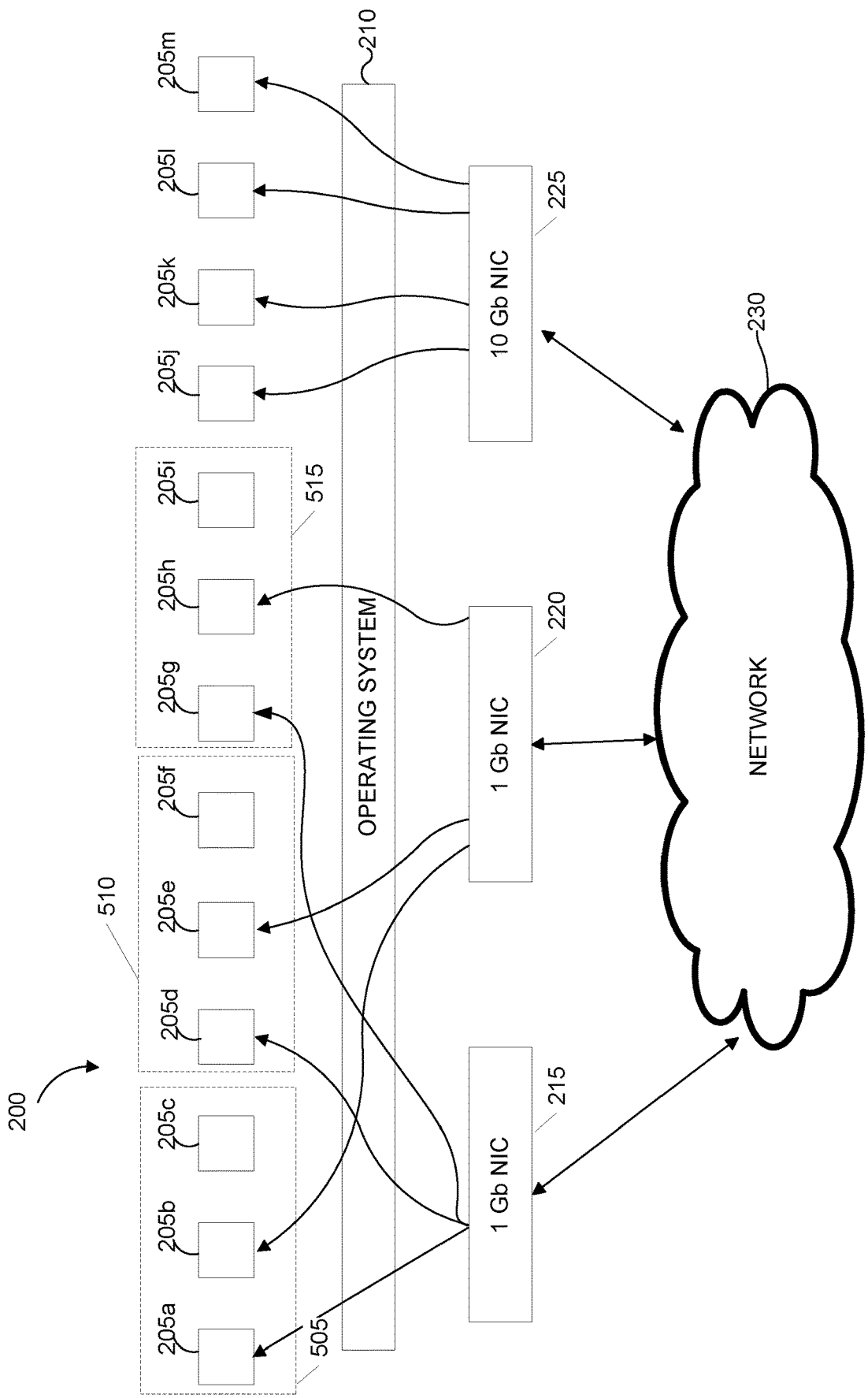
FIG. 5 is a block diagram depicting an example technique for aligning processors within one or more NUMA nodes with NICs, in accordance with some embodiments of the invention.

Certain implementations may include processors that are grouped into NUMA nodes. As such, some embodiments of the invention provide configuration options which enable processors to be aligned with NICs such that the available NUMA nodes on the system are fully utilized for networking-related tasks. For example, some embodiments may enable alignment of processors in each NUMA node on the system to a particular NUMA-enabled NIC, thereby enabling traffic to be distributed across NUMA nodes on the system. An example is depicted in FIG. 5, in which NICs 215, 220 are NUMA-enabled NICs, while NIC 225 is not NUMA-enabled. Processors 205a-205i are grouped into three NUMA nodes, with processors 205a-205c comprising NUMA node 505, processors 205d-205f comprising NUMA node 510, and processors 205g-205i comprising NUMA node 515. In the example shown, when NICs 215, 220 and 225 become available to operating system 210, processors from each of NUMA nodes 505, 510 and 515 are assigned to each of NICs 215 and 220. Thus, processor 205a from NUMA node 505, processor 205d from NUMA node 510, and processor 205g from NUMA node 515 are aligned with NIC 215, and processor 205b from NUMA node 505, processor 205e from NUMA node 510 and processor 205h from NUMA node 515 are aligned with NIC 220.

In some embodiments, processors are assigned to NUMA-enabled NICs prior to being assigned to non-NUMA-enabled NICs, to maximize the probability that each NUMA-enabled NIC is aligned with at least one processor from each NUMA node, thereby enabling traffic to be distributed across the NUMA nodes on the system. For example, processors may be assigned to NUMA-enabled NICs until each NIC is assigned the maximum number of processors it can support. In these embodiments, processors may then be assigned to non-NUMA enabled NICs. Thus, in the example shown in FIG. 5, each of NUMA-enabled NICs 215 and 220 has the capacity to support two processors. After processors 205a, 205d are assigned to NIC 215, and processors 205b, 205e are assigned to NIC 220, then processors 205j-205m are assigned to NIC 225. Of course, embodiments of the invention are not limited to such an implementation, as processors may be assigned to NICs having various characteristics in any suitable order and/or manner.

As a result of the example configuration shown in FIG. 5, traffic from NICs 215 and 220 may be distributed across the available NUMA nodes 505, 510 and 515 on the system. Of course, it should be appreciated that the example distribution depicted in FIG. 5 is merely illustrative. For example, it can be seen that in FIG. 5, processors in certain NUMA nodes (i.e., processors 205c, 205f and 205i) go unused, and this need not be the case. Further, traffic need not be distributed to all NUMA nodes, or distributed evenly across NUMA nodes as shown. Any suitable manner of implementation may be employed, as embodiments of the invention are not limited in this respect.

Referring again to FIG. 2, after processors are aligned with NICs in act 105, process 100 proceeds to act 110, wherein processing tasks are dynamically redistributed from one or more processors to one or more other processors. Redistribution of processing tasks may be performed, as an example, when one or more criteria are satisfied. In an example implementation described below, redistribution is performed upon a determination that one or more of the processors on the system exceeds a predetermined threshold utilization level. However, it should be appreciated that redistribution may be performed upon the satisfaction of any one or more criteria, including criteria which are unrelated to processor utilization, as embodiments of the invention are not limited in this respect.

Figure 6:
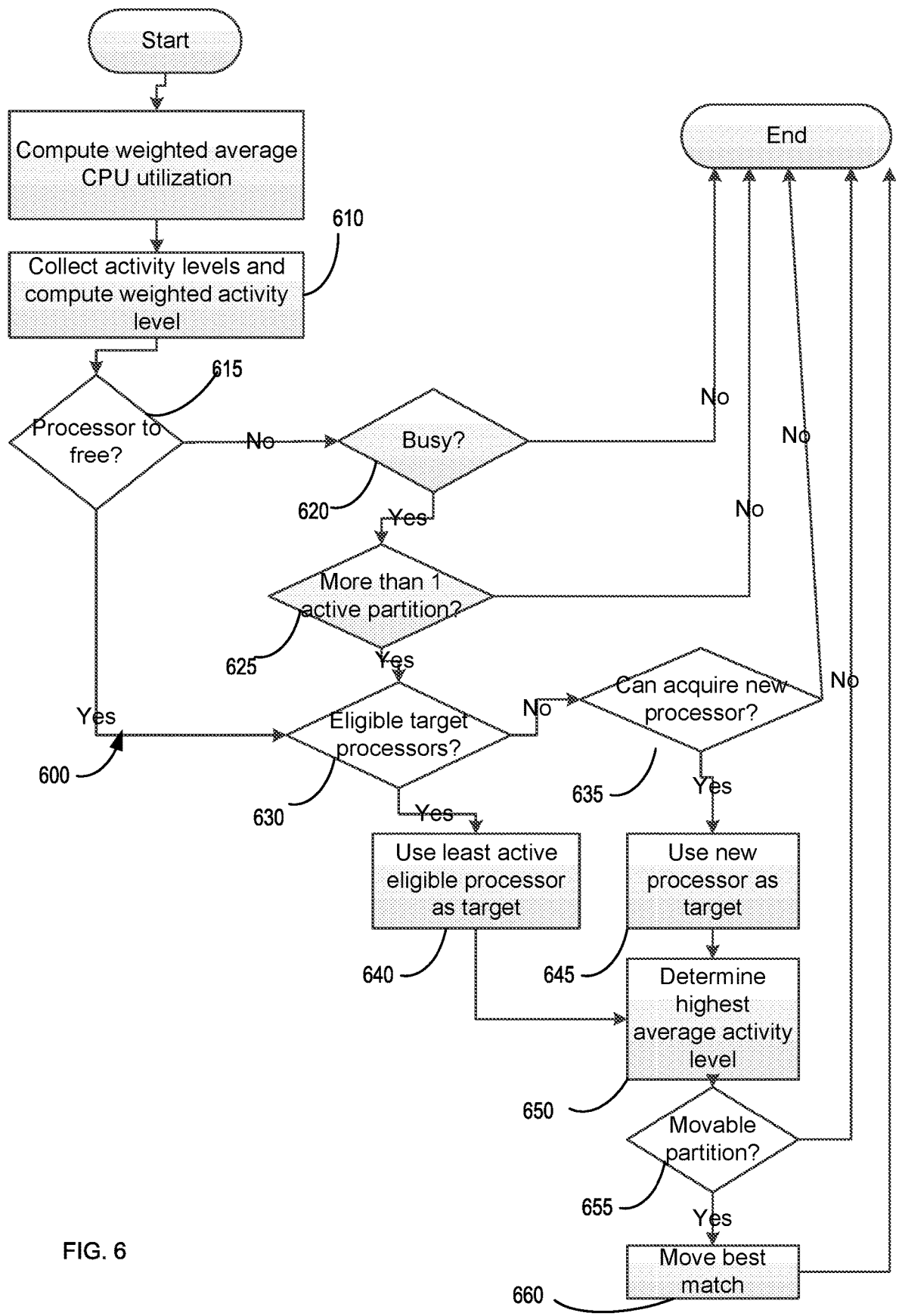
FIG. 6 is a flowchart depicting an example process for redistributing processing tasks associated with information received via a network, in accordance with some embodiments of the invention.

An example process 600 for redistributing processing tasks upon a determination that one or more processors is over-burdened is depicted in FIG. 6. Process 600 may, for example, be performed by each individual processor on system 200 at periodic, predefined intervals (e.g., every two seconds). However, it should be appreciated that processes for determining whether one or more processors is over-burdened and/or redistributing processing tasks may be performed by any suitable system component, in response to any suitable event and/or upon any suitable criteria being satisfied, as embodiments of the invention are not limited to any particular implementation.

At the start of process 600, a weighted average utilization is computed for a particular processor in act 605. For example, act 605 may include a processor calculating a weighted average utilization, based on busy and idle cycle counts, using techniques which are known in the art for measuring processor load. Any suitable technique may be employed to calculate weighted average utilization, as embodiments of the invention are not limited in this respect.

Process 600 then proceeds to act 610, wherein a weighted activity level is computed for the particular processor. This also may be performed in any suitable fashion. For example, in some embodiments, the weighted activity level is based on a number of Internet Protocol (IP) datagrams handled by the processor during a given interval, including IP datagrams corresponding to locally-destined segments and datagrams destined for remote devices. Of course, embodiments of the invention are not so limited, as a weighted average activity level may be calculated using any suitable technique(s).

At the completion of act 610, process 600 proceeds to act 615, wherein a determination is made whether the processor is a "processor to free." In this respect, a processor may be designated as one that is to be freed of its processing responsibilities for any of various reasons. For example, for power conservation reasons, a processor may be designated as one which is to be freed of its responsibilities so that power is not consumed to keep it running.

If it is determined in act 615 that the particular processor is not a processor to free, then process 600 proceeds to act 620, wherein it is determined whether the processor is busy. This determination may, for example, be based on an analysis of information gathered in acts 605 and/or 610, and/or other information. Analysis may be performed in any suitable manner, such as by determining whether information collected in acts 605 and/or 610 indicates that the processor's weighted average utilization and/or weighted activity level exceed(s) one or more predetermined thresholds. For example, in some embodiments, a processor may be deemed "busy" after its weighted average utilization exceeds ninety percent, until its weighted average utilization is less than seventy percent. Of course, any suitable measurement(s) may be used to determine whether a processor is busy.

In the example process 600, if it is determined in act 620 that the processor is not busy, process 600 completes. As a result, the processor executing example process 600 is not identified as one from which processing tasks should be shifted.

If, however, it is determined in act 620 that the processor is busy, then example process 600 proceeds to act 625, wherein it is determined whether the processor is currently handling more than one active partition. A partition may, for example, represent one or more connections over which information is received at the processor. If it is determined that the processor is not currently handling more than one active partition, then process 600 completes. If, however, it is determined that the processor is handling more than one active partition, or if it is determined in act 615 that the processor is a processor to free, then process 600 proceeds to act 630, wherein a determination is made whether there are eligible "target" processors to which tasks currently handled by the processor in question may be shifted.

Figure 7:
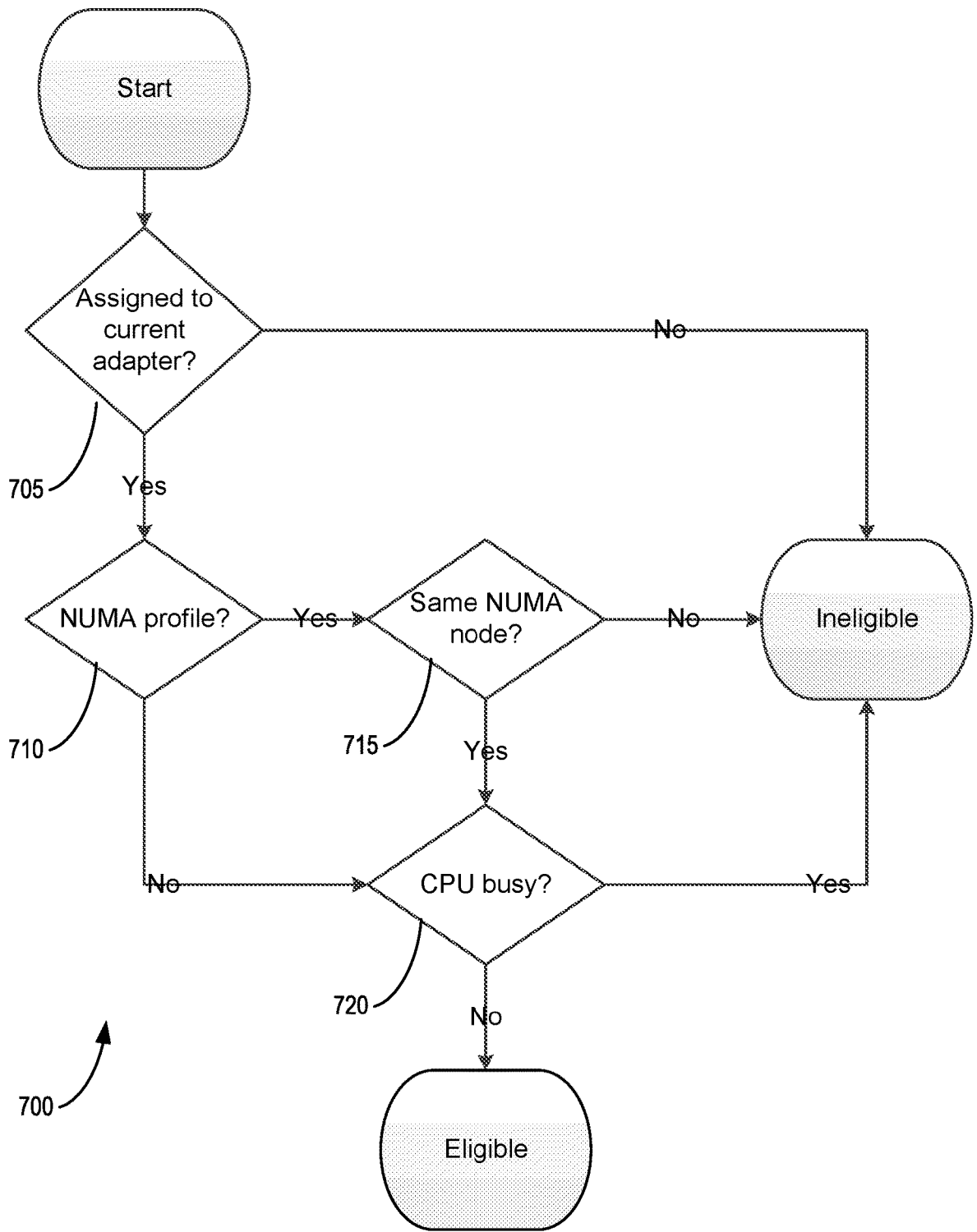
FIG. 7 is a flowchart depicting an example process for locating a processor to which to redistribute processing tasks, in accordance with some embodiments of the invention.

An example process 700 for determining whether there are any eligible target processors is depicted in FIG. 7. Process 700 may, for example, involve the processor which performs process 600 (FIG. 6) examining characteristics of one or more other processors on the system, although embodiments of the invention are not limited to such an implementation.

At the start of example process 700, a determination is made in act 705 whether a processor being examined is assigned to the same adapter as the processor that executes example process 700, indicating that the processor being examined is aligned with the same NIC as the processor which executes example process 700. If not, it is determined that the processor being examined is ineligible as a target processor to which to shift networking-related tasks, and example process 700 completes.

If, however, the processor being examined is assigned to the same adapter, then process 700 proceeds to act 710, wherein a determination is made whether a user has invoked a NUMA profile. A NUMA profile having been invoked may indicate that the system employs a NUMA architecture, such that particular processors may be grouped into one or more NUMA nodes. If it is determined that a user has invoked a NUMA profile, then example process 700 proceeds to act 715, wherein a determination is made whether the processor being examined resides in the same NUMA node as the processor that performs example process 700. In this respect, the inventors have recognized the undesirability of shifting processing tasks from a processor in one NUMA node to a processor in another NUMA node, since doing so could cause the processor to which the task is shifted to access the memory of the other NUMA node to complete an networking-related task, which can detract from system performance. As a result, some embodiments of the invention keep processing tasks from being shifted from a processor in one NUMA node to a processor in another NUMA node. In this respect, if it is determined in act 715 that the processor being examined does not reside in the same NUMA node as the processor that performs example process 700, then the processor being examined is determined to be ineligible as a target processor, and example process 700 completes.

If it is determined in act 715 that the processor being examined is in the same NUMA node, or if it is determined in act 710 that the user has not invoked a NUMA profile, then example process 700 proceeds to act 720, wherein a determination is made whether the processor being examined is busy. This determination may, for example, be based on an analysis of information, collected for the processor being examined, similar to that which is collected in acts 605 and 610 (FIG. 6). Of course, a determination whether a processor is busy may be based on any suitable criteria, as embodiments of the invention are not limited in this respect.

If it is determined that the processor being examined is busy, then the processor is determined to be ineligible, and example process 700 completes. If it is determined that the processor is not too busy, then it is determined to be an eligible processor. In some embodiments, the processor may, for example, be added to a list or other collection of target processors to which networking-related tasks may be shifted. Example process 700 then completes.

Figure 8:
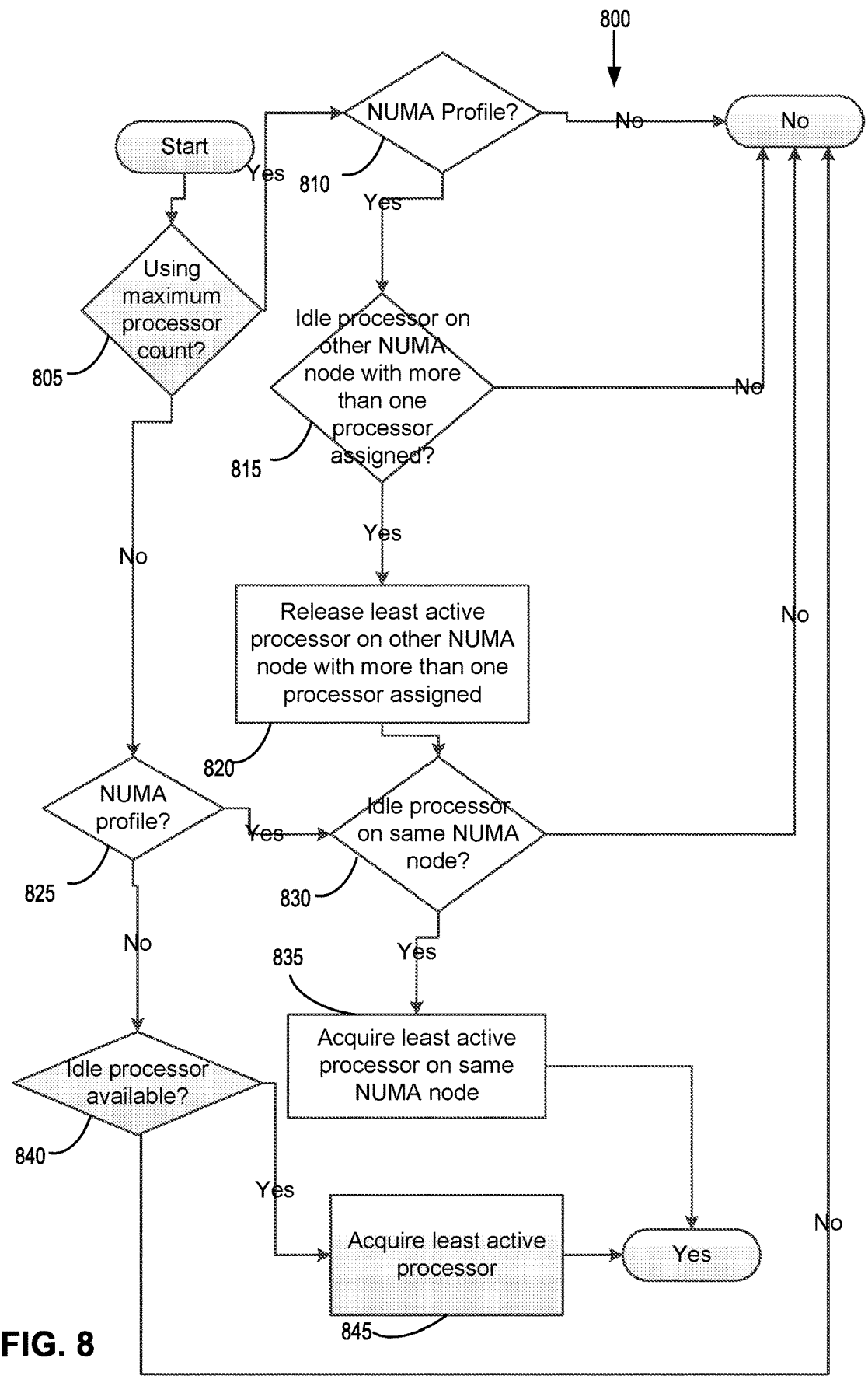
FIG. 8 is a flowchart depicting an example process by which a NIC may acquire a new processor to handle processing tasks, in accordance with some embodiments of the invention.

Returning to example process 600 (FIG. 6), if it is determined in act 630 that there are no eligible target processors, then example process 600 proceeds to act 635, wherein a determination is made whether a new processor can be acquired for use. An example process 800 for making this determination is shown in FIG. 8. Example process 800 may, for example, involve a processor examining characteristics of one or more other processors on the system, including those aligned with the NIC to which the processor executing example process 600 is aligned, and those aligned with other NICs on the system.

At the start of process 800, a determination is made in act 805 whether a NIC being examined is currently aligned with its maximum number of processors. For example, each NIC on the system may have a maximum number of processors which it can support, and/or a configuration option or policy may specify that a particular NIC be aligned with only a certain number of processors. A maximum number of processors may be specified in any suitable manner.

If it is determined in act 805 that the NIC being examined is currently aligned with a maximum number of processors, then process 800 proceeds to act 810, wherein a determination is made whether a NUMA profile is invoked, indicating that the system employs a NUMA architecture. A NUMA profile may be invoked, for example, by a user or other entity. If it is determined that a NUMA profile has not been invoked, then example process 800 completes with a conclusion that there are no processors to acquire to which to shift networking-related tasks.

If, however, it is determined in act 810 that a NUMA profile is invoked, then process 800 proceeds to act 815, wherein a determination is made whether there is an idle processor on a NUMA node, different than that to which the NIC is presently aligned, with more than one processor assigned. In some embodiments, an idle processor may be one with a weighted average utilization of less than twenty percent, although any suitable measurement of processor utilization and/or activity may be employed. If it is determined that there is an idle processor on a NUMA node, then example process 800 completes with a conclusion that there are no processors to acquire.

If, however, it is determined in act 815 that there is at least one idle processor on another NUMA node, then process 800 proceeds to act 820, wherein the least active processor on the other NUMA node is released for use. A "least active" processor may be determined using any suitable technique, as embodiments of the invention are not limited in this respect. For example, the least active processor may be identified using information similar to that which is collected in act 605 and 610 for each processor on the other NUMA node.

At the completion of act 820, example process 800 proceeds to act 830, wherein a determination is made whether there is an idle processor on the same NUMA node as that to which the NIC is presently aligned. If not, it is determined that there are no processors to acquire, and example process 800 completes.

If it is determined in act 830 that there is at least one idle processor on the same NUMA node, then example process 800 proceeds to act 835, wherein the least active processor on the same NUMA node is acquired for use, and process 800 then completes. As noted above with respect to act 815, the least active processor may be identified using any suitable criteria and/or technique, as embodiments of the invention are not limited in this respect.

Returning to act 805, if it is determined in that the NIC is not presently using its maximum processor count, then process 800 proceeds to act 825, wherein it is determined whether the user has invoked a NUMA profile. If so, example process 800 proceeds to act 830, and proceeds as described above. If not, process 800 proceeds to act 840, wherein a determination is made whether an idle processor is available. If it is determined that an idle processor is available, then the least active processor (identified using any suitable technique) is acquired, and process 800 then completes. If it is determined in act 840 that no idle processor is available, then no processor is acquired, and example process 800 completes.

Returning again to act 635 (FIG. 6), if it is determined that no new processor can be acquired, then process 600 completes. If, however, it is determined in act 635 that a new processor can be acquired, then example process 600 proceeds to act 645, wherein the new processor is designated as the target. Similarly, if it is determined in act 630 that there are eligible target processors, then the least active eligible processor is identified in act 640 and designated as the target processor.

At the completion of either of acts 640 or 645, process 600 proceeds to act 650, wherein a highest average activity level for all processors on the system is determined. This may, for example, reflect a recognition that shifting processing tasks from one processor to another, only to make the receiving processor the busiest processor on the system, is undesirable. Consequently, in some embodiments of the invention, the most heavily utilized processor on the system is first identified, and processing tasks are shifted only if the activity level on the receiving processor will not exceed that of the busiest processor.

Figure 9:
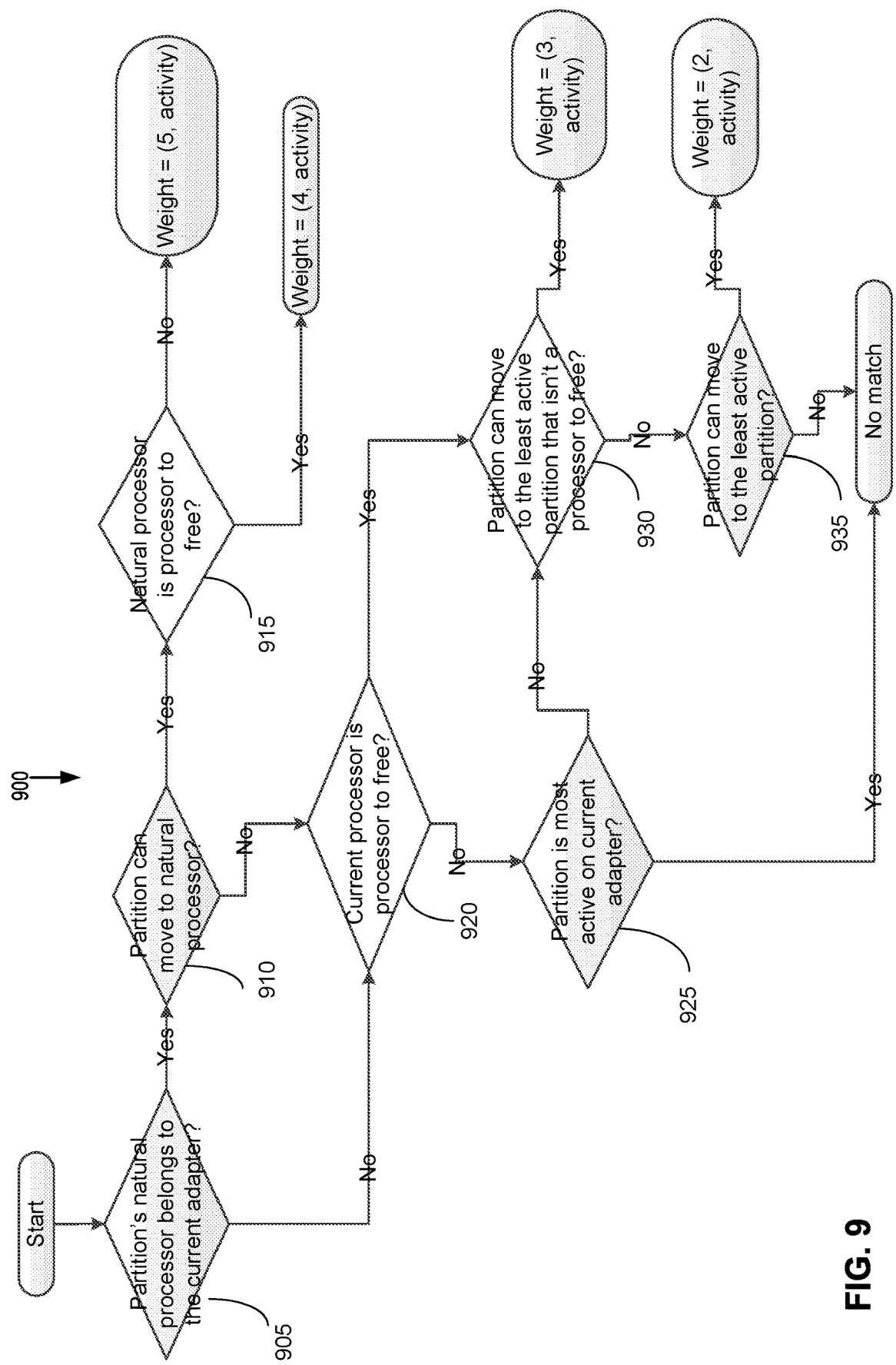
FIG. 9 is a flowchart depicting an example process for determining one or more partitions representing processing tasks to be redistributed from one processor to another, in accordance with some embodiments of the invention.

Process 600 then proceeds to act 655, wherein a determination is made whether any partition assigned to the processor being examined is movable. An example process 900 for making this determination is shown in FIG. 9. Example process 900 may, for example, involve examining characteristics of various partitions currently assigned to a particular processor to determine the desirability of moving any to another processor for execution.

At the start of example process 900, a determination is made in act 905 whether the natural processor for a particular partition belongs to the same adapter as that to which the processor is assigned. In this respect, a partition's natural processor may, for example, handle timer processing for the partition. If it is determined in act 905 that the partition's natural processor belongs to the current adapter, then example process 900 proceeds to act 910, wherein a determination is made in act 910 whether the partition can move to the natural processor. This determination may involve evaluating any suitable criteria, including (for example) the present level of activity on the natural processor.

If it is determined in act 910 that the partition can be moved to the natural processor, then example process 900 proceeds to act 915, wherein it is determined whether the natural processor is the processor to free (as described above in relation to act 615, FIG. 6). If it is determined that the natural processor is not the processor to free, then the partition is assigned a weight represented by a 2-tuple comprising a five and the activity level for the partition. In some embodiments, the first component of the 2-tuple representing the weight indicates how desirable it is to move the partition, with higher numbers indicating greater desirability, and the second component of the 2-tuple is used to select from among partitions assigned the same first component. For example, if two partitions were assigned a weight 2-tuple having a first component of five, then the partition having the greatest amount of associated activity may be identified as the most desirable of the two partitions to move. Of course, desirability may be determined in any of numerous ways, as embodiments of the invention are not limited in this respect. Example process 900 then completes.

If it is determined in act 915 that the natural processor is the processor to free, then the partition is assigned a weight represented by a 2-tuple comprising a four and the partition's activity level.

If it is determined in act 910 that the partition cannot move to the natural processor, or if it is determined in act 905 that the partition's natural processor is not assigned to the current adapter, then example process 900 proceeds to act 920, wherein it is determined whether the current processor is the processor to free. If it is determined in act 920 that the current processor is the processor to free, then example process 900 proceeds to act 930, wherein it is determined whether the partition can move to the least active partition that isn't a processor to free. If so, the partition is assigned a weight represented by a 2-tuple comprising the number three and the partition's activity level, and example process 900 completes.

If it is determined in act 930 that the partition cannot move to the processor to which the least active partition that is not a processor to free has been assigned, then example process 900 proceeds to act 935, wherein it is determined whether the partition can move to the least active processor. If so, the partition is assigned a weight represented by a 2-tuple comprising the number two and the partition's activity level. If not, it is determined that the current partition cannot be moved, and example process 900 completes.

If it is determined in act 920 that the current processor is not the processor to free, then example process 900 proceeds to act 925, wherein it is determined whether the partition being examined is the most current on the current adapter. If not, example process 900 proceeds to act 930, and continues as described above. If it is determined that the partition being examined is the most active on the current adapter, then it is determined that the current partition cannot be moved, and example process 900 completes.

Referring again to process 600 in FIG. 6, if it is determined in act 655 that there is at least one movable partition, then example process 600 proceeds to act 660, wherein the best match is moved to a different processor. As described above, the best match may, for example, be a partition having a weight comprising a highest numeric value. If multiple partitions have a weight comprising the same numeric value, then the partition having the highest associated activity level may be selected as a best match. Of course, not all embodiments of the invention are limited to such an implementation, as a best partition to move may be selected using any suitable criteria and/or technique.

At the completion of act 660, or if it is determined in act 655 that there are no movable partitions, then example process 600 completes.

Another configuration option may enable an application on a NUMA system to identify the NUMA node(s) on which networking-related tasks are being performed, so that application-related processing may be performed on the same node(s). In this respect, as noted above, a process running on one NUMA node which attempts access to the memory of another NUMA node (e.g., to complete a networking-related task, to perform application processing, etc.) can significantly detract from overall system performance. Consequently, some embodiments of the invention enable an application to identify a NUMA node and processor that presently services a connection over which information being processed by the application is received, so that the application itself may execute on the same node, thereby avoiding attempts to access memory addresses associated with another NUMA node. Of course, it should be appreciated that embodiments of the invention are not limited to enabling an application to identify which NUMA node handles a connection. For example, some embodiments may enable an application to specify a NUMA node on which it executes (or previously executed), so that networking-related tasks may be moved to that NUMA node for processing. Embodiments of the invention may be implemented in any of numerous ways.

Figure 10:
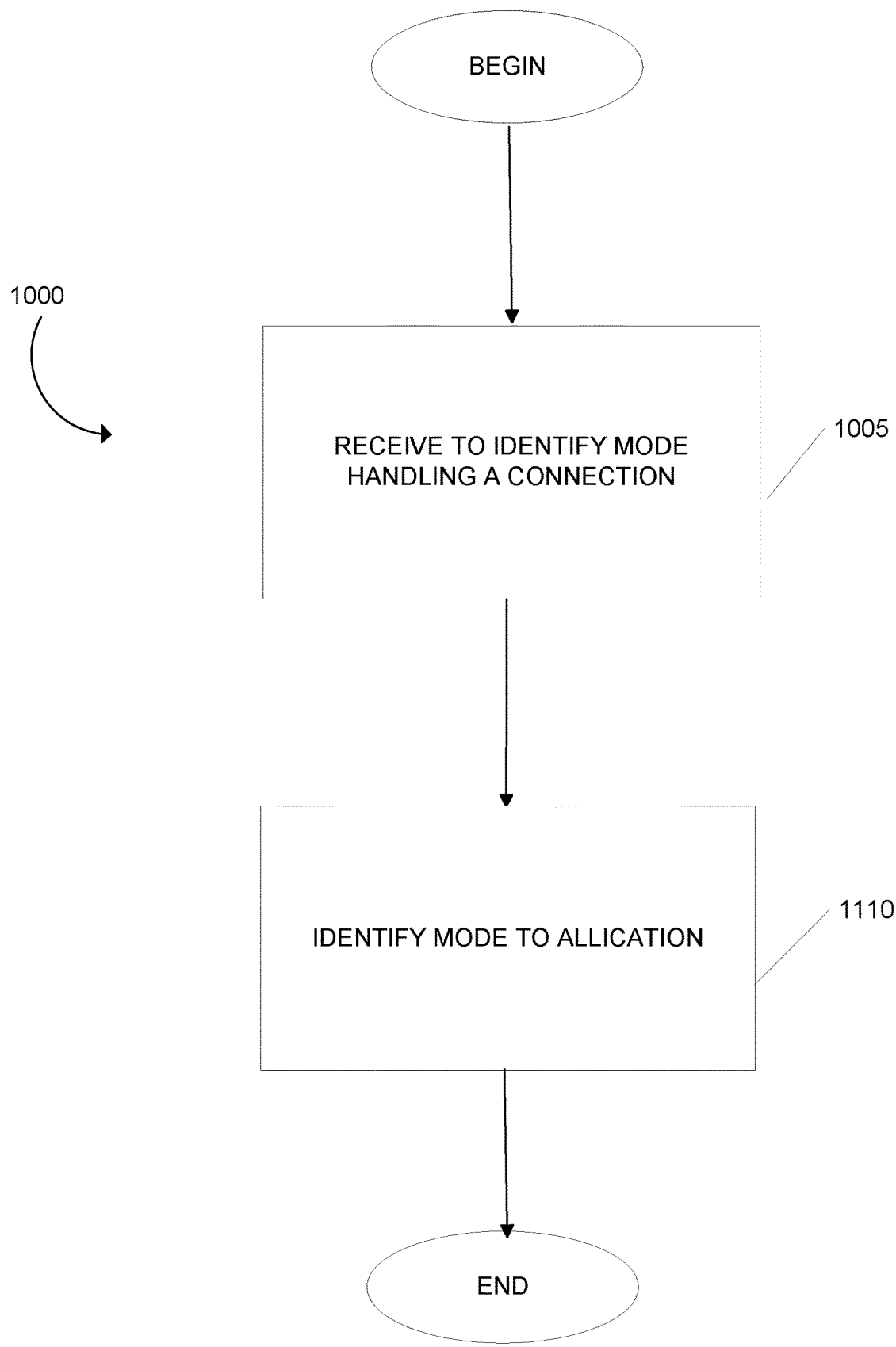
FIG. 10 is a flowchart depicting an example process for identifying to an application a node handling a connection, in accordance with some embodiments of the invention.

An example process 1000 for identifying a node handling a particular connection is shown in FIG. 10. At the start of process 1000, a request to identify the node handling a particular connection is received in act 1005. For example, embodiments of the invention may provide an application programming interface (API) which may receive a query from an application to identify a NUMA node presently handling a particular connection. It should be appreciated, however, that embodiments of the invention are not limited to employing an API which an application may use to submit a query, as any suitable facility may alternatively be employed.

At the completion of act 1005, an identification of the node is provided to the application in act 1010. An application may use this information to, for example, "wake up" on the same node, to prevent attempts to access memory of one or more other NUMA nodes. Example process 1000 then completes.

Figure 11:
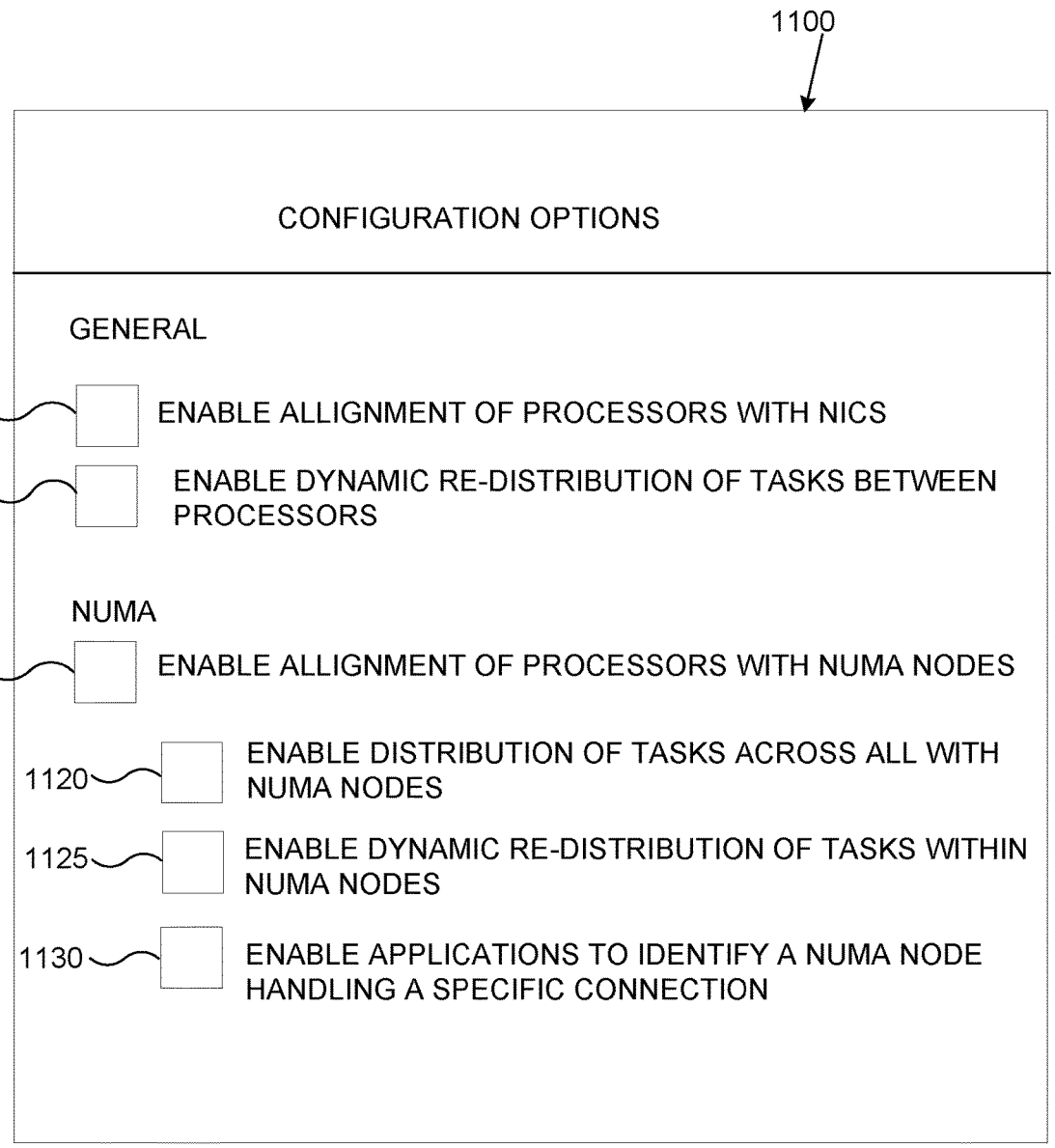
FIG. 11 is a depiction of an example user interface operative to present various configuration options to a user for selection.

FIG. 11 depicts an example user interface (UI) 1100 which a user may employ to invoke one or more configuration options. Example UI 1100 may, for example, be presented by operating system 210 (FIGS. 1-5) to enable a user (e.g., a system administrator) to define a mode of distributing networking-related tasks among processors on a multi-processor computer system. For example, a user (e.g., a system administrator) may select from among multiple configuration options presented by UI 1100, each configuration option defining (e.g., in the form of a policy) a mode of processing networking-related tasks by processors on a system. The example UI 1100 enables a user to select from among various configuration options by providing input to various check-boxes, as shown. For example, a user may invoke a configuration option whereby certain processors are aligned with specific NICs as described above by providing input to check-box 1105, and invoke a configuration option whereby networking-related tasks are dynamically re-distributed between processors as described above by providing input to check-box 1110. A user may enable a grouping of processors into NUMA nodes by providing input to check-box 1115, which may make check-boxes 1120, 1125 and 1130 available for selection. Specifically, a user may enable distribution of networking-related tasks across NUMA nodes by providing input to check-box 1120, enable dynamic re-distribution of tasks within NUMA nodes by providing input to check-box 1125, and enable applications to determine which NUMA node handles a particular connection by providing input to check-box 1130. Of course, example UI 1100 represents merely one example of an interface that may be used to present configuration options to a user for selection. Any alternative suitable manner of presentation may be employed, as embodiments of the invention are not limited to any particular implementation.

Figure 12:
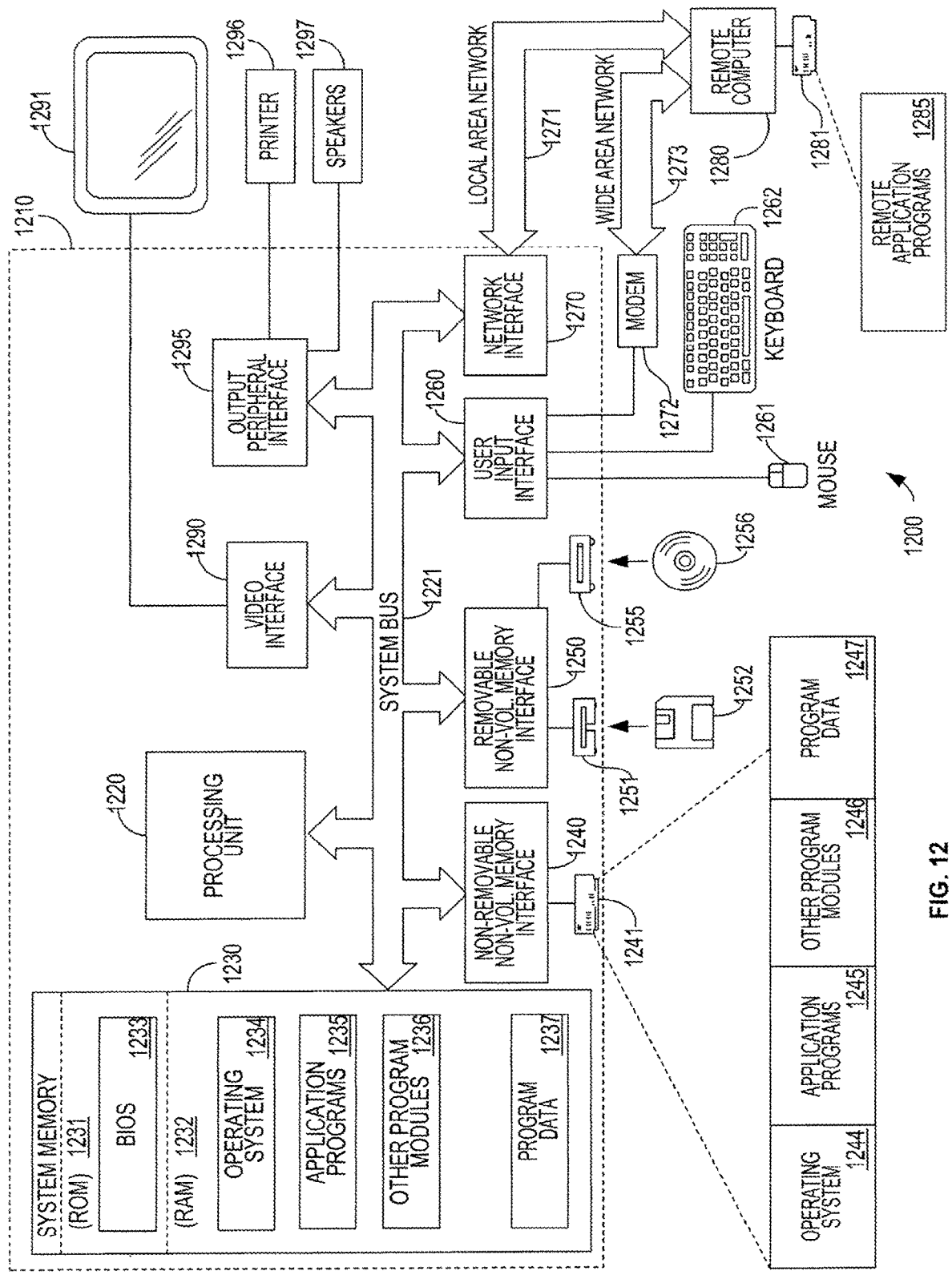
FIG. 12 is a block diagram depicting an example computer which may be used to implement aspects of embodiments of the invention.

FIG. 12 illustrates an example of a suitable computing system environment 1200 on which the invention may be implemented. The computing system environment 1200 is only one example of a suitable computing environment and is not intended to suggest any limitation as to the scope of use or functionality of the invention. Neither should the computing environment 1200 be interpreted as having any dependency or requirement relating to any one or combination of components illustrated in the exemplary operating environment 1200.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The computing environment may execute computer-executable instructions, such as program modules. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 12, an exemplary system for implementing the invention includes a general purpose computing device in the form of a computer 1210. Components of computer 1210 may include, but are not limited to, a processing unit 1220, a system memory 1230, and a system bus 1221 that couples various system components including the system memory to the processing unit 1220. The system bus 1221 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 1210 typically includes a variety of computer readable media. Computer readable media can be any available media that can be accessed by computer 1210 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 1210. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 1230 includes computer storage media in the form of volatile and/or nonvolatile memory such as read only memory (ROM) 1231 and random access memory (RAM) 1232. A basic input/output system 1233 (BIOS), containing the basic routines that help to transfer information between elements within computer 1210, such as during start-up, is typically stored in ROM 1231. RAM 1232 typically contains data and/or program modules that are immediately accessible to and/or presently being operated on by processing unit 1220. By way of example, and not limitation, FIG. 12 illustrates operating system 1234, application programs 1235, other program modules 1236, and program data 1237.

The computer 1210 may also include other removable/non-removable, volatile/nonvolatile computer storage media. By way of example only, FIG. 12 illustrates a hard disk drive 1240 that reads from or writes to non-removable, nonvolatile magnetic media, a magnetic disk drive 1251 that reads from or writes to a removable, nonvolatile magnetic disk 1252, and an optical disk drive 1255 that reads from or writes to a removable, nonvolatile optical disk 1256 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 1241 is typically connected to the system bus 1221 through an non-removable memory interface such as interface 1240, and magnetic disk drive 1251 and optical disk drive 1255 are typically connected to the system bus 1221 by a removable memory interface, such as interface 1250.

The drives and their associated computer storage media discussed above and illustrated in FIG. 12, provide storage of computer readable instructions, data structures, program modules and other data for the computer 1210. In FIG. 12, for example, hard disk drive 1241 is illustrated as storing operating system 1244, application programs 1245, other program modules 1246, and program data 1247. Note that these components can either be the same as or different from operating system 1234, application programs 1235, other program modules 1236, and program data 1237. Operating system 1244, application programs 1245, other program modules 1246, and program data 1247 are given different numbers here to illustrate that, at a minimum, they are different copies. A user may enter commands and information into the computer 1210 through input devices such as a keyboard 1262 and pointing device 1261, commonly referred to as a mouse, trackball or touch pad. Other input devices (not shown) may include a microphone, joystick, game pad, satellite dish, scanner, or the like. These and other input devices are often connected to the processing unit 1220 through a user input interface 1260 that is coupled to the system bus, but may be connected by other interface and bus structures, such as a parallel port, game port or a universal serial bus (USB). A monitor 1291 or other type of display device is also connected to the system bus 1221 via an interface, such as a video interface 1290. In addition to the monitor, computers may also include other peripheral output devices such as speakers 1297 and printer 1296, which may be connected through a output peripheral interface 1295.

The computer 1210 may operate in a networked environment using logical connections to one or more remote computers, such as a remote computer 1280. The remote computer 1280 may be a personal computer, a server, a router, a network PC, a peer device or other common network node, and typically includes many or all of the elements described above relative to the computer 1210, although only a memory storage device 1281 has been illustrated in FIG. 12. The logical connections depicted in FIG. 12 include a local area network (LAN) 1271 and a wide area network (WAN) 1273, but may also include other networks. Such networking environments are commonplace in offices, enterprise-wide computer networks, intranets and the Internet.

When used in a LAN networking environment, the computer 1210 is connected to the LAN 1271 through a network interface or adapter 1270. When used in a WAN networking environment, the computer 1210 typically includes a modem 1272 or other means for establishing communications over the WAN 1273, such as the Internet. The modem 1272, which may be internal or external, may be connected to the system bus 1221 via the user input interface 1260, or other appropriate mechanism. In a networked environment, program modules depicted relative to the computer 1210, or portions thereof, may be stored in the remote memory storage device. By way of example, and not limitation, FIG. 12 illustrates remote application programs 1285 as residing on memory device 1281. It will be appreciated that the network connections shown are exemplary and other means of establishing a communications link between the computers may be used.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a computer readable storage medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other tangible computer storage medium and/or storage device) encoded with one or more programs that, when executed on one or more computers or other processors, perform methods that implement the various embodiments of the invention discussed above. As is apparent from the foregoing examples, a computer readable storage medium may retain information for a sufficient time so as to be considered a non-transitory storage medium. Such a computer readable storage medium or media can be transportable, such that the program or programs stored thereon can be loaded onto one or more different computers or other processors to implement various aspects of the present invention as discussed above. As used herein, the term "computer-readable storage medium" encompasses only a computer-readable medium that can be considered an article of manufacture (e.g., a portable storage device) or a machine. Alternatively or additionally, the invention may be embodied as a computer readable medium other than a computer-readable storage medium, such as a propagating signal.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing, and is therefore not limited in its application to the details and arrangement of components set forth in the foregoing description or illustrated in the drawings. For example, aspects of one embodiment may be combined in any manner with aspects of other embodiments.

Also, the invention may be embodied as a method, an example of which is described with reference to the drawings. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method performed by a processor within a computer system that comprises a plurality of processors, the processor being part of a Non-Uniform Memory Access (NUMA) node, the method comprising:
   determining that processing responsibilities for the processor should be reduced;
   identifying an active partition handled by the processor that is movable to another processor;
   evaluating a plurality of other processors for eligibility to handle the active partition;
   excluding from a set of eligible processors any processors that are not part of the NUMA node;
   calculating an activity level for each processor in the set of eligible processors;
   selecting a target processor that is part of the NUMA node, wherein the target processor is selected based at least in part on the activity level of the target processor; and
   moving the active partition to the target processor.

2. The method of claim 1, wherein:
   the processor is assigned to a network interface controller (NIC); and
   the method further comprises excluding from the set of eligible processors any processors that are not assigned to the NIC.

3. The method of claim 1, further comprising excluding from the set of eligible processors any processors whose activity level exceeds a threshold level for activity.

4. The method of claim 1, wherein calculating the activity level comprises calculating, for each processor in the set of eligible processors, at least one of a weighted average utilization or a weighted activity level.

5. The method of claim 1, further comprising acquiring an idle processor that is available on the NUMA node to which the processor belongs, wherein the idle processor is selected as the target processor.

6. The method of claim 5, further comprising causing the idle processor to be released from a different NUMA node other than the NUMA node to which the processor belongs.

7. The method of claim 1, wherein identifying the active partition comprises:
   assigning a weight to the active partition; and
   using the weight to determine whether the active partition is movable.

8. The method of claim 1, further comprising:
   calculating the activity level of a busiest processor among the plurality of processors; and
   determining that moving the active partition to the target processor would not cause the activity level of the target processor to exceed the activity level of the busiest processor.

9. A system, comprising:
   a processor that is part of a Non-Uniform Memory Access (NUMA) node;
   a network interface card (NIC), wherein the processor is assigned to the NIC;
   memory in electronic communication with the processor; and
   instructions stored in the memory, the instructions being executable by the processor to:
      determine that processing responsibilities for the processor should be reduced;
      identify an active partition handled by the processor that is movable to another processor;
      evaluate a plurality of other processors for eligibility to handle the active partition;
      exclude from a set of eligible processors any processors that are not part of the NUMA node;
      exclude from the set of eligible processors any processors that are not assigned to the NIC;
      calculate an activity level for each processor in the set of eligible processors;
      select a target processor that is part of the NUMA node, wherein the target processor is selected based at least in part on the activity level of the target processor; and
      move the active partition to the target processor.

10. The system of claim 9, further comprising additional instructions that are executable by the processor to exclude from the set of eligible processors any processors whose activity level exceeds a threshold level for activity.

11. The system of claim 9, wherein calculating the activity level comprises calculating, for each processor in the set of eligible processors, at least one of a weighted average utilization or a weighted activity level.

12. The system of claim 9, further comprising additional instructions that are executable by the processor to acquire an idle processor that is available on the NUMA node to which the processor belongs, wherein the idle processor is selected as the target processor.

13. The system of claim 12, wherein the additional instructions are also executable by the processor to cause the idle processor to be released from a different NUMA node other than the NUMA node to which the processor belongs.

14. The system of claim 9, wherein identifying the active partition comprises:
   assigning a weight to the active partition; and using the weight to determine whether the active partition is movable.

15. The system of claim 9, further comprising additional instructions that are executable by the processor to:
   calculate the activity level of a busiest processor among the plurality of other processors; and
   determine that moving the active partition to the target processor would not cause the activity level of the target processor to exceed the activity level of the busiest processor.

16. A computer-readable medium comprising instructions that are executable by a processor that is part of a Non-Uniform Memory Access (NUMA) node and that is assigned to a network interface controller (NIC), wherein execution of the instructions causes the processor to:
   determine that processing responsibilities for the processor should be reduced;
   identify an active partition handled by the processor that is movable to another processor;
   evaluate a plurality of other processors for eligibility to handle the active partition;
   exclude from a set of eligible processors any processors that are not part of the NUMA node;
   exclude from the set of eligible processors any processors that are not assigned to the NIC;
   calculate an activity level for each processor in the set of eligible processors;
   select a least active processor in the set of eligible processors as a target processor; and
   move the active partition to the target processor.

17. The computer-readable medium of claim 16, further comprising additional instructions that are executable by the processor to exclude from the set of eligible processors any processors whose activity level exceeds a threshold level for activity.

18. The computer-readable medium of claim 16, further comprising additional instructions that are executable by the processor to acquire an idle processor that is available on the NUMA node to which the processor belongs, wherein the idle processor is selected as the target processor.

19. The computer-readable medium of claim 18, wherein the additional instructions are also executable by the processor to cause the idle processor to be released from a different NUMA node other than the NUMA node to which the processor belongs.

20. The computer-readable medium of claim 16, further comprising additional instructions that are executable by the processor to:
   calculate the activity level of a busiest processor among the plurality of other processors; and
   determine that moving the active partition to the target processor would not cause the activity level of the target processor to exceed the activity level of the busiest processor.

* * * * *